US007006723B2

(12) United States Patent
Kim et al.

(10) Patent No.: US 7,006,723 B2
(45) Date of Patent: Feb. 28, 2006

(54) OPTICAL ADD/DROP MULTIPLEXER

(75) Inventors: Jong-Kwon Kim, Taejonkwangyok-shi (KR); Yun-Je Oh, Yongin-shi (KR); Jun-Ho Koh, Suwon-shi (KR); Ki-Cheol Lee, Suwon-shi (KR)

(73) Assignee: Samsung Electronics Co., Ltd.,, Suwon-si (KR)

( * ) Notice: Subject to any disclaimer, the term of this patent is extended or adjusted under 35 U.S.C. 154(b) by 276 days.

(21) Appl. No.: 10/681,923

(22) Filed: Oct. 9, 2003

(65) Prior Publication Data

US 2004/0223687 A1 Nov. 11, 2004

(30) Foreign Application Priority Data

May 6, 2003 (KR) ...................... 10-2003-0028527

(51) Int. Cl.
*G02B 6/28* (2006.01)
(52) U.S. Cl. .............................. 385/24; 385/15; 398/83
(58) Field of Classification Search .................. 385/24; 398/83
See application file for complete search history.

(56) References Cited

U.S. PATENT DOCUMENTS

| 6,243,179 | B1 * | 6/2001 | Thompson et al. ............. 398/9 |
| 6,266,460 | B1 * | 7/2001 | Doerr ............................ 385/16 |
| 6,307,656 | B1 * | 10/2001 | Terahara ....................... 398/139 |

* cited by examiner

*Primary Examiner*—Juliana Kang
(74) *Attorney, Agent, or Firm*—Cha & Reiter, L.L.C.

(57) ABSTRACT

An optical add/drop multiplexer includes a multiplexing/demultiplexing unit having an input multiplexing port, an output multiplexing port and a plurality of demultiplexing ports each connected to a respective optical circulator. Each optical circulator includes a first port for internally inputting an added channel, a second port for outputting the added channel to a corresponding demultiplexing port and receiving a channel outputted by the corresponding demultiplexing port, and a third port for outputting the channel received from the second port. Each of optical switches is located between adjacent circulators, wherein each optical switch includes a first input port, coupled to the third port of one optical circulator, for receiving the channel from the third port, a second input port for receiving an externally added channel, a first output port, coupled to another first port of another optical circulator, for outputting the added channel to another first port, and a second output port for externally outputting the channel inputted through the first input port according to the dropping operation.

20 Claims, 2 Drawing Sheets

OPTICAL ADD/DROP MULTIPLEXER

CLAIM OF PRIORITY

This application claims priority to an application entitled "OPTICAL ADD/DROP MULTIPLEXER," filed in the Korean Intellectual Property Office on May 6, 2003 and assigned Serial No. 2003-28527, the contents of which are hereby incorporated by reference.

BACKGROUND OF THE INVENTION

1. Field of the Invention

The present invention relates to an optical add/drop multiplexer, and more particularly to an optical add/drop multiplexer including a 2×N arrayed-waveguide grating capable of functioning as a multiplexer and demultiplexer.

2. Description of the Related Art

A passive optical network (PON) includes a single communication line between a central office and a plurality of optical network units. A single optical fiber is coupled between the central office and a remote node installed at a region closest to the plurality of optical network units, and independent optical fibers are coupled between the remote node and subscribers such that the PON is based on a double star structure. The above-described PON is a communication system capable of transmitting a plurality of communication signals through the single communication line. The PON can be based, for example, on a time division multiple access (TDMA), wavelength division multiple access (WDMA), sub-carrier multiple access (SCMA), or other signal division method.

The above-described WDMA-based PON transmits optical signals of different wavelengths assigned to respective subscribers. The WDMA-based PONs are widely used since they can be sufficiently configured using only conventional devices and afford the potential for large communication capacity, communication network security, etc.

The above-described WDMA-based PONs include a uni-directional ring optical communication network based on two optical fibers having a self-healing function, a bi-directional ring optical communication network based on four optical fibers having a self-healing function, and an all-optical network based on a mesh form. The above-described ring optical communication network consists of a plurality of nodes including optical add/drop multiplexers for transmitting (or adding) and receiving (or dropping) optical signals. The optical add/drop multiplexers are important devices needed for implementing the optical communication network, and add or drop an optical signal having a preset wavelength used in optical communication on the optical communication network.

FIG. 1 is a view illustrating a configuration of a conventional optical add/drop multiplexer using a wavelength division multiplexer and a wavelength division demultiplexer. The conventional optical add/drop multiplexer shown includes a demultiplexer 110 for demultiplexing an optical signal, produced by a multiplexing operation, into a plurality of channels having different wavelengths; a plurality of optical switches 130 having one-to-one correspondence with the channels produced by the demultiplexing operation; a multiplexer 120 for multiplexing a plurality of added channels received from the optical switches 130; and a controller (not shown) for outputting, to the optical switches 130, control signals needed for adjusting adding/dropping operations for preset wavelength-based channels.

Conventionally, the demultiplexer 110 is based on a 1×N arrayed-waveguide grating, which includes an input demultiplexing port 111 coupled to an input fiber 101, a plurality of output demultiplexing ports 112 having one-to-one correspondence with a plurality of channels of different wavelengths produced by the demultiplexing operation, etc. An optical signal inputted into the input demultiplexing port 111 is demultiplexed into a plurality of channels having different wavelengths ($\lambda_{i1} \sim \lambda_{iN}$) and then the channels produced by the demultiplexing operation are outputted to the output demultiplexing ports 112. The output demultiplexing ports 112 have one-to-one correspondence with the channels produced by the demultiplexing operation.

Analogously, the multiplexer 120 is typically based on an N×1 arrayed-waveguide grating including a plurality of input multiplexing ports 121 forming input paths for added or bypass channels, an output multiplexing port 122 coupled to an output fiber 102 for externally outputting an optical signal produced by the multiplexing operation, etc. The multiplexer 120 multiplexes the added or bypass channels inputted into the input multiplexing ports 121.

Each of the optical switches 130 is based on a 2×2 optical switch having the first and second input ports 131 and 132 and the first and second output ports 133 and 134. The optical switches 130 have one-to-one correspondence with the output demultiplexing ports 112 of the demultiplexer 110 and the input multiplexing ports 121 of the multiplexer 120.

The first input ports 131 are coupled to the output demultiplexing ports 112, such that the channels having wavelengths ($\lambda_{i1} \sim \lambda_{iN}$) produced by the demultiplexing operation are inputted into the optical switches 130. The second input ports 132 input the added channels into the optical switches 130. The added channels inputted into the second input ports 132 have wavelengths ($\lambda_{j1} \sim \lambda_{jN}$) different from the wavelengths ($\lambda_{i1} \sim \lambda_{iN}$) produced by the demultiplexing operation of the demultiplexer 110.

The first output ports 133 have one-to-one correspondence with the input multiplexing ports 121 of the multiplexer 120, such that the added or bypass channels are outputted. The second output ports 134 externally output the channels to be dropped.

In a bypass operation 130a of the optical switch 130, a bypass channel among the channels having wavelengths ($\lambda_{i1} \sim \lambda_{iN}$) inputted into the first input port is outputted to the input multiplexing port 121 of the multiplexer 120 through the first output port. In an adding or dropping operation 130b of the optical switch 130, an added channel among the channels having wavelengths ($\lambda_{j1} \sim \lambda_{jN}$) is outputted to the first output port 133 according to an adding operation. Channels to be dropped, having the wavelengths ($\lambda_{i1} \sim \lambda_{iN}$) and inputted into the first input ports 131, are externally outputted through the second output ports 134 according to a dropping operation.

Problematically, the two arrayed-waveguide gratings used as a multiplexer and demultiplexer of the add-drop multiplexer must be controlled to assume the same wavelength transmission characteristics.

In avoiding this problem use can be made of a loop-back type optical add/drop multiplexer based on a N×N arrayed-waveguide grating or a fold-back type optical add/drop multiplexer based on a 2×N arrayed-waveguide grating capable of performing functions of the multiplexer and demultiplexer. However, the loop-back type optical add/drop multiplexer includes a plurality of arrayed-waveguide grating ports which increases cross talk between input/ output channels, and the fold-back type optical add/drop multiplexer is limited in the number of channels capable of being processed.

SUMMARY OF THE INVENTION

The present invention has been made in view of the above problems, and, in one aspect, provides an optical add/drop multiplexer that, in performing functions of a multiplexer and demultiplexer, reduces cross talk between channels and increases the number of available channels.

In accordance with an aspect of the present invention, there is provided an optical add/drop multiplexer that includes a multiplexing/demultiplexing unit having an input multiplexing port, an output multiplexing port and a plurality of demultiplexing ports. Connected to respective one of the plural demultiplexing ports is a plurality of optical circulators. Each circulator has a first port for internally inputting an added channel, a second port for outputting the added channel over the connection to the output multiplexing port and for receiving a channel over the connection from the input multiplexing port, and a third port for externally outputting the channel received over the connection. An optical switch is associated with a first one and a second one of the plural optical circulators. The switch has a first input port, coupled to the third port of the first circulator, for receiving the channel from the third port, a second input port for receiving the added channel to be outputted by the second circulator, a first output port, coupled to the first port of the second circulator, for outputting the added channel to the first port of the second circulator, and a second output port for externally outputting the channel received by the first circulator according to the dropping operation.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the annexed drawings, omitting unneeded detailed description of known functions and configurations.

Figure 1:
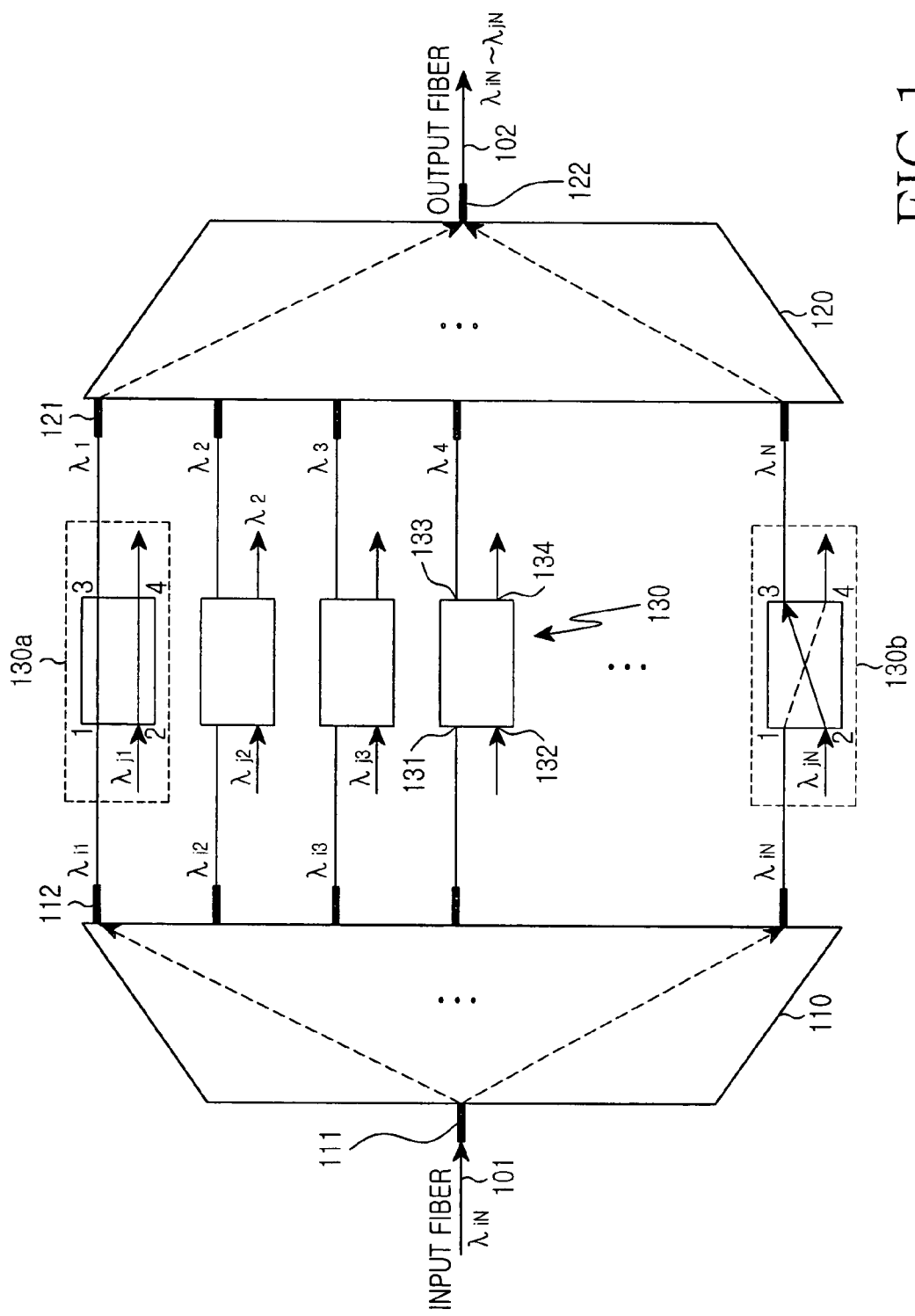
FIG. 1 is a view illustrating the configuration of a conventional optical add/drop multiplexer using a multiplexer and demultiplexer.
Figure 2:
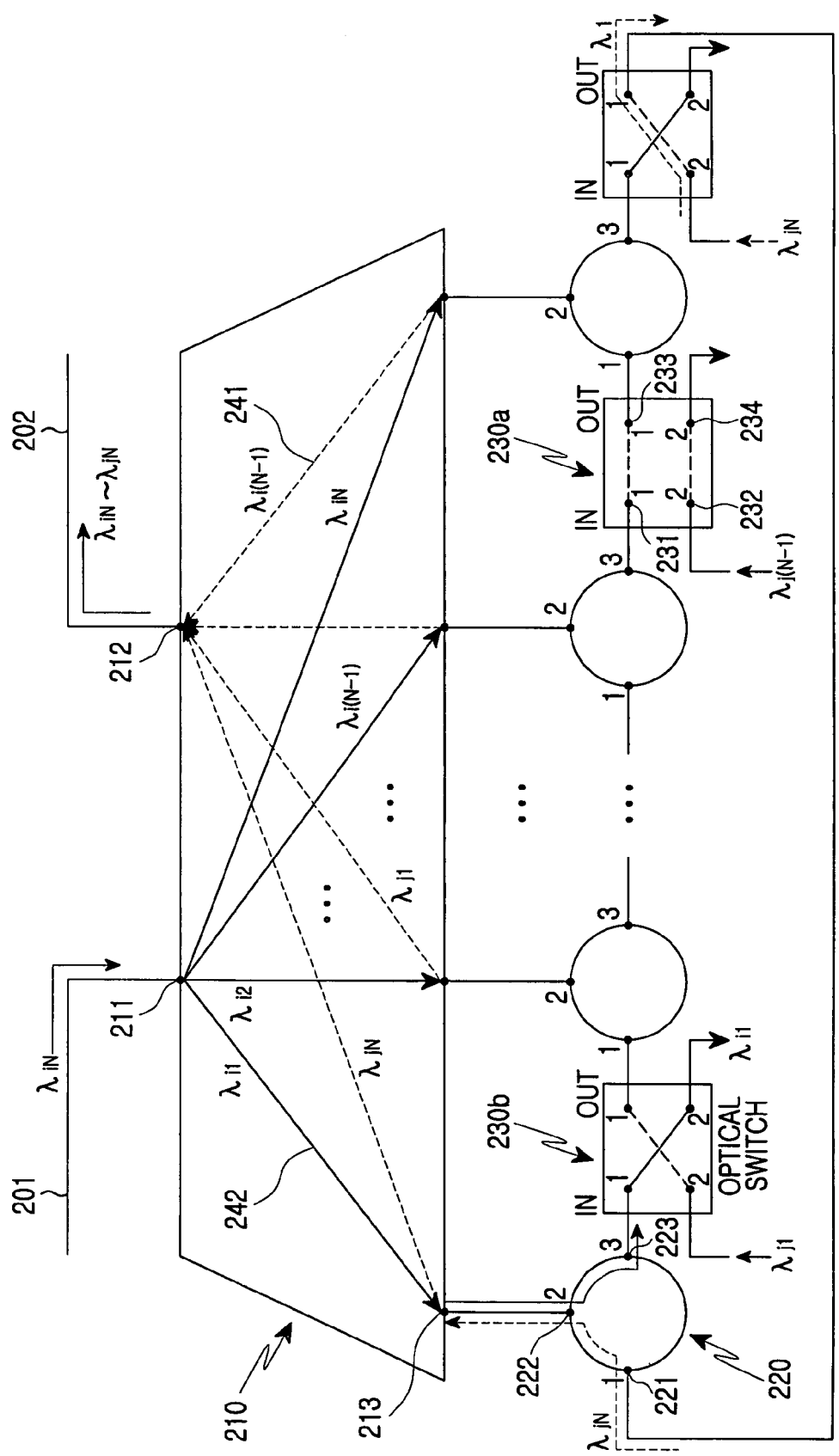
FIG. 2 is a view illustrating an exemplary configuration for an optical add/drop multiplexer that includes a 2×N multiplexing/demultiplexing unit in accordance with the present invention.

FIG. 2 is a view illustrating, by way of illustrative and non-limitative example, a configuration for an optical add/drop multiplexer that includes a 2×N multiplexing/demultiplexing unit in accordance with the present invention. The inventive optical add/drop multiplexer includes a multiplexing/demultiplexing unit 210; a plurality of optical circulators 220 forming input/output paths for channels having preset wavelengths; and a plurality of optical switches 230 for outputting, to the optical circulators 220, bypass channels among channels of preset wavelengths ($\lambda_{i1} \sim \lambda_{iN}$) or added channels having the wavelengths ($\lambda_{j1} \sim \lambda_{jN}$) externally inputted.

The multiplexing/demultiplexing unit 210 includes an input multiplexing port 211 coupled to an input fiber 201 serving as a transmission medium for an optical signal ($\lambda_{IN}$) produced by a multiplexing operation; an output multiplexing port 212 coupled to an output fiber 202 serving as another transmission medium for optical signals ($\lambda_{i1} \sim \lambda_{iN}$) produced by a multiplexing operation; and a plurality of demultiplexing ports 213 for inputting/outputting a plurality of channels having preset wavelengths ($\lambda_{i1} \sim \lambda_{iN}$ and $\lambda_{j1} \sim \lambda_{jN}$). The multiplexing/demultiplexing unit 210 demultiplexes the optical signal ($\lambda_{IN}$) produced by the multiplexing operation into a plurality of channels having different wavelengths ($\lambda_{i1} \sim \lambda_{iN}$) and then outputs the channels having the different wavelengths ($\lambda_{i1} \sim \lambda_{iN}$) to the demultiplexing ports 213. Then, the multiplexing/demultiplexing unit 210 multiplexes the added channels having wavelengths ($\lambda_{j1} \sim \lambda_{jN}$) and the bypass channels having wavelengths ($\lambda_{i1} \sim \lambda_{iN}$), and then outputs the channels having the wavelengths ($\lambda_{i1} \sim \lambda_{iN}$ and $\lambda_{j1} \sim \lambda_{jN}$) to the output multiplexing port 212. The multiplexing/demultiplexing unit 210 can be implemented, for example, with an optical fiber grating.

Each optical circulator 220 outputs an added channel inputted into the first port 221 of the optical circulator 220 to the second port 222 of the optical circulator coupled to each demultiplexing port 213 of the multiplexing/demultiplexing unit 210. The optical circulators 220 output channels ($\lambda_{i1} \sim \lambda_{iN}$), produced by the multiplexing operation, inputted into the second ports 222 of the optical circulators 220 to the third ports 223 of the optical circulators 220. The optical circulators 220 have one-to-one correspondence with the demultiplexing ports 213 of the multiplexing/demultiplexing unit 210.

The optical switches 230 are located between and coupled to the adjacent optical circulators 220, respectively. Each optical switch 230 consists of two input ports and two output ports. The first input port is coupled to the third port of the optical circulator 220, the first output port coupled to the first port of the optical circulator 220, the second input port is for receiving an added channel, and the second output port is for outputting a channel to be dropped among channels ($\lambda_{i1} \sim \lambda_{iN}$) inputted into the first input port. That is, the first input ports of the optical switches 230 receive channels ($\lambda_{iN}$) produced by the demultiplexing operation of the multiplexing/demultiplexing unit 210, and the second input ports of the optical switches 230 receive externally added channels ($\lambda_{jN}$).

If the channel inputted into the first input port is to be dropped, the channel is outputted to the second output port; otherwise the channel is bypassed to first output port. A channel inputted into the second input port of the optical switch 230, i.e., a channel to be added, is outputted to the first port of an adjacent optical circulator 220 through the first output port.

A channel outputted through the first output port of the optical switch 230, either as a bypassed or added channel, is inputted by the adjacent optical circulator 220 into its multiplexing/demultiplexing ports, for subsequent multiplexing to form a multiplexed channel for output through the output multiplexing port 212 to the output fiber 202.

As apparent from the above description, the present invention provides an optical add/drop multiplexer including a 2×N arrayed-waveguide grating capable of carrying out the functions of a multiplexer and demultiplexer, thereby reducing time of carrying out a manufacturing process and manufacturing cost. Moreover, since input and output ports of each optical switch are coupled to the optical circulators which are connected to different demultiplexing ports, the optical add/drop multiplexer of the present invention can increase the number of available channels in comparison with the conventional loop-back or fold-back type optical add/drop multiplexer.

Although preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but defined by the claims which follow, along with their full scope of equivalents.

What is claimed is:

1. An optical add/drop multiplexer comprising:
    a multiplexing/demultiplexing unit including an input multiplexing port, an output multiplexing port and a plurality of demultiplexing ports;
    connected to respective ones of the plural demultiplexing ports, a plurality of optical circulators each including a first port for internally inputting an added channel, a second port for outputting the added channel over the connection to the output multiplexing port and for receiving a channel over the connection from the input multiplexing port, and a third port for externally outputting the channel received over the connection; and
    associated with a first one and a second one of the plural optical circulators, an optical switch that includes:
        a first input port, coupled to the third port of said first one, for receiving said channel received by said first one;
        a second input port for receiving said added channel to be outputted by said second one;
        a first output port, coupled to said first port of said second one, for outputting said added channel to said first port of the second one; and
        a second output port for externally outputting said channel received by said first one according to a dropping operation.

2. The optical add/drop multiplexer of claim 1, wherein each of the plural optical circulators is associated, as said first one, with a respective optical switch that includes the first and second input ports and the first and second output ports.

3. The optical add/drop multiplexer of claim 2, wherein each of the plural optical circulators is associated, as said second one, with a respective optical switch that includes the first and second input ports and the first and second output ports.

4. The optical add/drop multiplexer of claim 1, wherein an input optical fiber is coupled to said input multiplexing port and wherein an output optical fiber is coupled to said output multiplexing port.

5. The optical add/drop multiplexer as set forth in claim 1, wherein the multiplexing/demultiplexing unit uses a 2×N arrayed-waveguide grating.

6. The optical add/drop multiplexer as set forth in claim 1, wherein said optical switch is configured to route a bypass channel from the first input port of said switch to the first output port of said switch.

7. The optical add/drop multiplexer as set forth in claim 6, wherein said optical switch is configured to determine if said channel received by said first one is said bypass channel.

8. The optical add/drop multiplexer as set forth in claim 7, wherein said optical switch is configured to externally output through the second output port said channel received by said first one according to said dropping operation if said channel received is determined to be other than said bypass channel.

9. The optical add/drop multiplexer of claim 8, wherein each of the plural optical circulators is associated, as said first one, with a respective optical switch that includes the first and second input ports and the first and second output ports.

10. The optical add/drop multiplexer of claim 9, wherein each of the plural optical circulators is associated, as said second one, with a respective optical switch that includes the first and second input ports and the first and second output ports.

11. An optical add/drop multiplexing method comprising the steps of:
    connecting to respective ones of plural demultiplexing ports, a plurality of optical circulators each including a first port for internally inputting an added channel, a second port for outputting the added channel over the connection to the output multiplexing port and for receiving a channel over the connection from the input multiplexing port, and a third port for externally outputting the channel received over the connection; and
    associating a first one and a second one of the plural optical circulators with an optical switch by configuring the switch to include:
        a first input port, coupled to the third port of said first one, for receiving said channel received by said first one;
        a second input port for receiving said added channel to be outputted by said second one;
        a first output port, coupled to said first port of said second one, for outputting said added channel to said first port of the second one; and
        a second output port for externally outputting said channel received by said first one according to a dropping operation.

12. The method of claim 11, wherein each of the plural optical circulators is associated, as said first one, with a respective optical switch that includes the first and second input ports and the first and second output ports.

13. The method of claim 12, wherein each of the plural optical circulators is associated, as said second one, with a respective optical switch that includes the first and second input ports and the first and second output ports.

14. The method of claim 11, further including the steps of coupling an input optical fiber to said input multiplexing port and coupling an output optical fiber to said output multiplexing port.

15. The method as set forth in claim 11, wherein the multiplexing/demultiplexing unit uses a 2×N arrayed-waveguide grating.

16. The method as set forth in claim 11, wherein said optical switch is configured to route a bypass channel from the first input port of said switch to the first output port of said switch.

17. The method as set forth in claim 16, wherein said optical switch is configured to determine if said channel received by said first one is said bypass channel.

18. The method as set forth in claim 17, wherein said optical switch is configured to externally output through the second output port said channel received by said first one according to said dropping operation if said channel received is determined to be other than said bypass channel.

19. The method of claim 18, wherein each of the plural optical circulators is associated, as said first one, with a respective optical switch that includes the first and second input ports and the first and second output ports.

20. The method of claim 19, wherein each of the plural optical circulators is associated, as said second one, with a respective optical switch that includes the first and second input ports and the first and second output ports.

* * * * *